United States Patent
Nomura

(10) Patent No.: US 12,454,982 B2
(45) Date of Patent: Oct. 28, 2025

(54) BEARING ATTACHMENT STRUCTURE

(71) Applicant: SANKEI GIKEN KOGYO CO., LTD., Tokyo (JP)

(72) Inventor: Tetsuaki Nomura, Isesaki (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 118 days.

(21) Appl. No.: 18/283,048

(22) PCT Filed: Mar. 26, 2021

(86) PCT No.: PCT/JP2021/013158
§ 371 (c)(1),
(2) Date: Sep. 20, 2023

(87) PCT Pub. No.: WO2022/201558
PCT Pub. Date: Sep. 29, 2022

(65) Prior Publication Data
US 2024/0167413 A1 May 23, 2024

(51) Int. Cl.
*F16C 35/02* (2006.01)
*F01N 13/08* (2010.01)
*F02D 9/10* (2006.01)

(52) U.S. Cl.
CPC ............ *F16C 35/02* (2013.01); *F01N 13/08* (2013.01); *F02D 9/10* (2013.01); *F16C 2226/36* (2013.01)

(58) Field of Classification Search
CPC .... F16C 35/02; F16C 35/045; F16C 2226/36; F02D 9/106
See application file for complete search history.

(56) References Cited

U.S. PATENT DOCUMENTS 9,752,614 B2 * 9/2017 Siebeneick .......... B60G 21/051
10,167,785 B2 1/2019 Oblinger et al.
(Continued)

FOREIGN PATENT DOCUMENTS

FR 2983251 A1 * 5/2013 ............... F02D 9/04
JP 2004-353635 A 12/2004
(Continued)

OTHER PUBLICATIONS

International Search Report dated Jun. 22, 2021, issued in counterpart International Application No. PCT/JP2021/013158. (2 pages).

*Primary Examiner* — James Pilkington
(74) *Attorney, Agent, or Firm* — WHDA, LLP

(57) ABSTRACT

Provided is a bearing attachment structure for attaching a bearing 71, 72 that supports a rotary shaft 3 inserted into a housing. The bearing attachment structure includes a bearing case 61, 62 including a base portion 612, 622 having a substantially cylindrical shape and a flange portion 611, 621 formed to spread outward from one end portion of the base portion 612, 622 in the axial direction. The bearing 71, 72 is installed in the bearing case 61, 62. The bearing case 61, 62 is disposed by aligning the flange portion 611, 621 with respect to the housing, and the bearing case 61, 62 is welded to the housing at the flange portion 611, 621. This can greatly reduce damage to a bearing caused by welding heat and reliably prevent breakage of the bearing, deterioration of lubricant on the bearing, and a reduction in service life of the bearing.

4 Claims, 7 Drawing Sheets

(56) References Cited

U.S. PATENT DOCUMENTS

| | | | |
|---|---|---|---|
| 10,458,343 B2 * | 10/2019 | Stark | F02M 26/70 |
| 2004/0216452 A1 | 11/2004 | Nakagome | |
| 2006/0059902 A1 * | 3/2006 | Gerards | F16K 27/0218 |
| | | | 60/324 |
| 2008/0168767 A1 | 7/2008 | Kanzawa et al. | |
| 2016/0032794 A1 | 2/2016 | Fischer et al. | |

FOREIGN PATENT DOCUMENTS

| | | |
|---|---|---|
| JP | 2008-169797 A | 7/2008 |
| JP | 2008-274895 A | 11/2008 |

* cited by examiner (a)

(b)

BEARING ATTACHMENT STRUCTURE

TECHNICAL FIELD

The present invention relates to a bearing attachment structure for attaching a bearing that supports, for example, a rotary shaft of a valve plate provided extending through an exhaust path of an automobile or the like.

BACKGROUND ART

In the related art, as an attachment structure for a bearing that supports a rotary shaft of a valve plate provided extending through an exhaust path of an automobile, there is known an attachment structure for a bearing that supports a rotary shaft of a valve plate in the exhaust valve described in Patent Document 1. In this attachment structure, the rotary shaft of the valve plate is provided extending through a pipe body configuring an exhaust path and bearings are installed in the vicinity of either end of the rotary shaft to support the rotary shaft. Each of the bearings is housed in a bottomed bearing case having a cylindrical shape and support the rotary shaft inserted into insertion holes formed in bottom portions of the bearing cases on the pipe body side. An opposite side of each of the bearing cases to the pipe body body is closed by a cap.

Each of the bearing cases is fixed to the pipe body by engaging engagement portions that protrude in the vicinity of the insertion hole of the bottom portion with a shaft insertion hole of the pipe body for positioning and welding a peripheral surface of the bottom portion. By fixing the bearing cases, the bearings supporting the vicinities of both ends of the rotary shaft are fixed at constant positions (see FIG. 3 and column 4, lines 3 to 12 of Patent Document 1).

CITED DOCUMENTS

Patent Literature

Patent Document 1: U.S. Ser. No. 10/167,785 B

SUMMARY OF INVENTION

Problem to be Solved by Invention

When forming the bearing attachment structure described in Patent Document 1, usually, the bearing case having a bottomed cylindrical shape and including the insertion hole in the bottom portion is formed by a cutting process, the bearings are press-fitted into the formed bearing cases, and then caps are welded to open apex portions of the bearings to close the bearings. Then, positioning is performed such that the insertion holes in the bottom portions of the bearing cases correspond to the shaft insertion holes in the pipe body, and then the outer peripheries of the bottom portions of the bearing cases are welded to the pipe body.

However, when the outer peripheries of the bottomed cylindrical bottom portions of the bearing cases already housing the bearings are welded to the pipe body, high heat generated by the welding may damage the bearings, and defects such as breakage of the bearings, deterioration of the lubricant on the bearings, and a reduction in service life of the bearings may occur. Accordingly, a structure that can reduce damage to the bearings caused by welding heat is in demand.

The present invention has been made in view of the above-described problems, and an object of the present invention is to provide a bearing attachment structure that can greatly reduce damage to a bearing caused by welding heat and reliably prevent breakage of the bearing, deterioration of lubricant on the bearing, and a reduction in service life of the bearing.

Solution to Problem

A bearing attachment structure according to the present invention is a bearing attachment structure for attaching a bearing that supports a rotary shaft inserted into a housing, the bearing attachment structure including a bearing case including a base portion having a substantially cylindrical shape and a flange portion formed to spread outward from one end portion of the base portion in the axial direction, the bearing being installed in the bearing case, in which the bearing case is disposed by aligning the flange portion with respect to the housing, and the bearing case is welded to the housing at the flange portion.

With this configuration, since the bearing case is welded to the housing at the flange portion, a distance to the bearing from the welded portion can be made long, the amount of heat transferred to the bearing installed in the bearing case during welding can be reduced to the extent possible, and damage to the bearing caused by welding heat can be greatly reduced. Accordingly, breakage of the bearing, deterioration of the lubricant on the bearing, and a reduction in service life of the bearing can be reliably prevented.

In the bearing attachment structure to the present invention, the housing is a pipe body having a substantially cylindrical shape, the flange portion is formed to be curved to match an outer peripheral surface of the pipe body, and the bearing case is welded to the pipe body at the flange portion.

With this configuration, since the flange portion of the bearing case is formed to be curved to match the outer peripheral surface of the peripheral wall of the pipe body, damage to the bearing caused by welding heat when the bearing case and the bearing installed inside the bearing case is attached to the outer peripheral surface of the pipe body having a curved plane shape can be greatly reduced, and the bearing case can be attached to the outer peripheral surface of the pipe body having a curved plane shape, stably and with high strength. Further, in a configuration in which the pipe body is an exhaust flow path, since the bearing case can be attached without protruding inside the pipe body, that is, inside the flow path and narrowing the flow path cross section, the flow path performance of the pipe body can be maintained.

In the bearing attachment structure to the present invention, the flange portion is formed by being deformed to bend from one end portion of the base portion in the axial direction.

With this configuration, since the bearing case is formed by being deformed to bend by press working or the like, the bearing case can be formed without an expensive cutting step, and manufacturing costs of a product including the bearing case and the bearing attachment structure can be reduced and the product can be manufactured efficiently. In particular, when a bearing case is formed by cutting a flange portion having a shape that curves to match the outer peripheral surface of the pipe body, processing costs are high and processing time is relatively high. However, when the bearing case has the above-described shape, the bearing case can be manufactured extremely cheaply and very efficiently.

The bearing attachment structure to the present invention includes a first bearing supporting one end portion side of the rotary shaft in the axial direction and a first bearing case including the first bearing, and a second bearing supporting another end portion side of the rotary shaft in the axial direction and a second bearing case including the second bearing, in which one of the first bearing case and the second bearing case is an integrally formed member formed such that an apex portion located on one end portion side of the base portion in the axial direction is closed.

With this configuration, since the bearing case is an integrally formed member formed such that an apex portion located on one end portion side of the base portion in the axial direction is closed, there is no need to retrofit a cap to close the apex portion, the number of components can be reduced and hence costs can be reduced, and the manufacturing process can be made more efficient by eliminating a cap retrofitting process.

Effects of Invention

The bearing attachment structure according to the present invention can greatly reduce damage to a bearing caused by welding heat and reliably prevent breakage of the bearing, deterioration of lubricant on the bearing, and a reduction in service life of the bearing.

DESCRIPTION OF EMBODIMENTS

Figure 1:
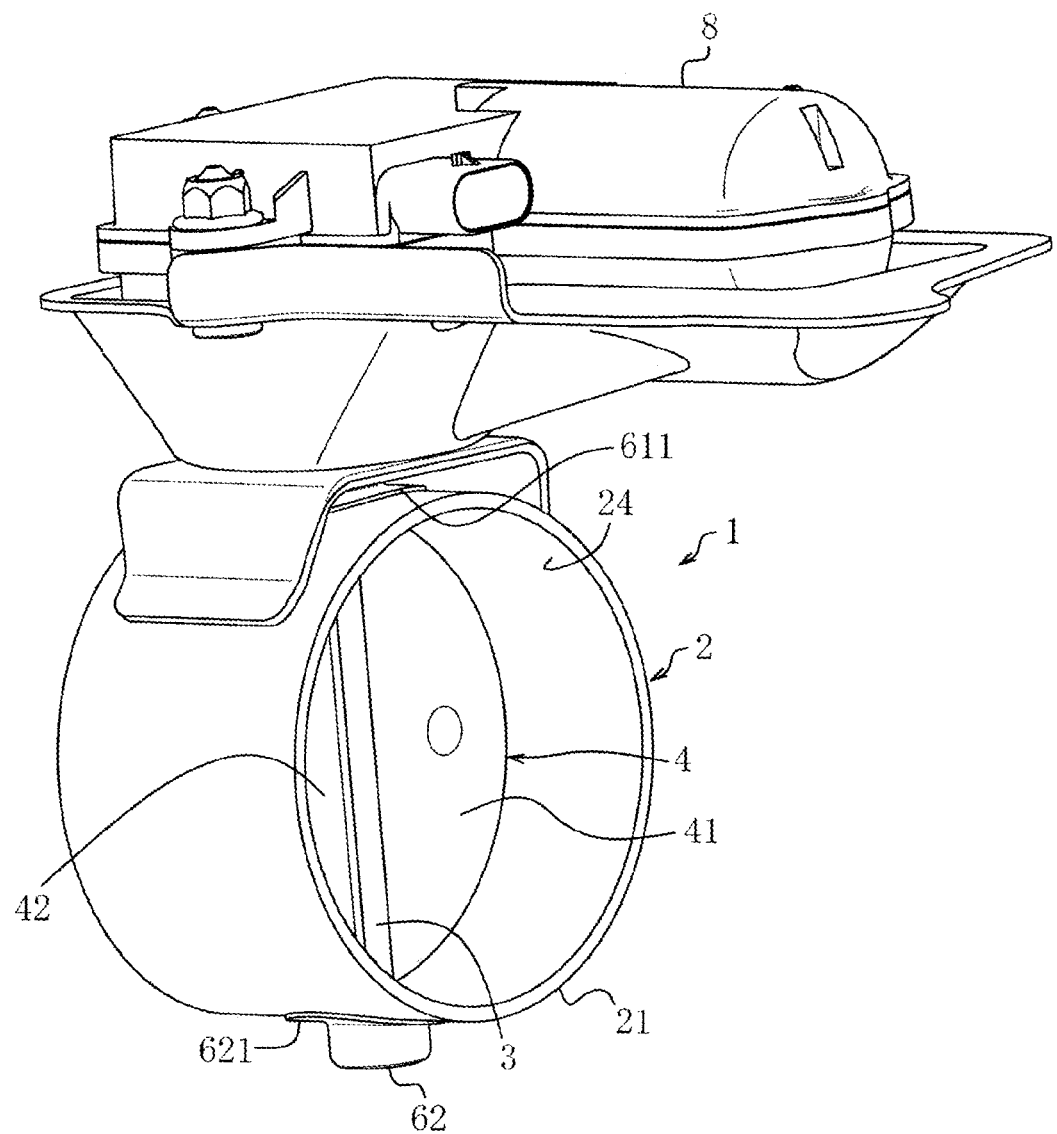
FIG. 1 is a schematic view illustrating a closed state of an exhaust valve including a bearing attachment structure according to an embodiment of the present invention.

Exhaust Valve Including Bearing Attachment Structure According to Embodiment

An exhaust valve 1 including a bearing attachment structure according to an embodiment of the present invention is installed in an exhaust path through which exhaust of an automobile flows and uses an open/close operation to regulate a flow rate of the exhaust and exhaust noise. As illustrated in FIGS. 1 to 3 and FIGS. 4 to 7, the exhaust valve 1 includes a pipe body 2 having a substantially cylindrical shape and corresponding to a housing, a rotary shaft 3 disposed in a direction orthogonal to an axial direction of the pipe body 2 and provided extending through a peripheral wall 21 through a substantial center of the pipe body 2, a valve plate 4 disposed inside of the pipe body 2 in a state of being fixed and attached to the rotary shaft 3, and a stopper 5 fixed inside of the pipe body 2.

The pipe body 2 corresponding to the housing according to the present embodiment connects an upstream pipe 11 and a downstream pipe 12 for exhaust, which configure the exhaust path. The upstream pipe 11 is fixed to one end portion side of the pipe body 2 in the pipe axial direction, and the downstream pipe 12 is fixed to another end portion side of the pipe body 2. Any method can be used to fix the upstream pipe 11 and the downstream pipe 12 for exhaust to the pipe body 2. Examples of the method include, for example, fixing the upstream pipe 11 to one end portion of the pipe body 2 in the pipe axial direction and the downstream pipe 12 to another end portion of the pipe body 2 by butt welding, internally fitting the upstream pipe 11 to one end portion side of the pipe body 2 in the pipe axial direction and the downstream pipe 12 to another end portion side of the pipe body 2 and fixing the upstream pipe 11 and the downstream pipe 12 to the pipe body 2 by fillet welding or penetration welding, and externally fitting the upstream pipe 11 to one end portion side of the pipe body 2 in the pipe axial direction and the downstream pipe 12 to another end portion side of the pipe body 2 and fixing the upstream pipe 11 and the downstream pipe 12 to the pipe body 2 by fillet welding or penetration welding.

Rotary shaft insertion holes 22 and 23 are formed in the peripheral wall 21 of the pipe body 2 at opposing positions in the radial direction. The rotary shaft 3 is disposed in the pipe body 2 such that one end portion of the rotary shaft 3 in the axial direction is inserted into the rotary shaft insertion hole 22 and another end portion of the rotary shaft 3 is inserted into the rotary shaft insertion hole 23.

A bearing case 61 having a substantially hat-like shape and an open apex portion is disposed outward of the rotary shaft insertion hole 22. As illustrated in FIG. 3(a), the bearing case 61 includes a base portion 612 having a substantially cylindrical shape and an open apex portion and a flange portion 611 formed to spread outward from one end portion of the base portion 612 in the axial direction. The bearing case 61 is an integrally formed member formed of a single metal material by press deformation such as press working, and is formed by being deformed such that the flange portion 611 bends from one end portion of the base portion 612 in the axial direction. The flange portion 611 is curved to match the outer peripheral surface of the pipe body 2, is formed recessed in an arc shape as viewed from the axial direction of the pipe body 2, and is formed to expand toward the pipe body 2 in an arc shape in a direction orthogonal to the axial direction of the pipe body 2. As illustrated in FIG. 3(a), the opposite end 613 of the base portion 612 is bent outward away from an axis of the substantially cylindrical shaped base portion 612.

The flange portion 611 formed by being deformed to match the outer peripheral surface of the peripheral wall 21 of the pipe body 2 is disposed along the outer peripheral surface of the peripheral wall 21 of the pipe body 2 corresponding to the housing, and is welded and fixed to the peripheral wall 21 of the pipe body 2 at an outward position separated from a root of the flange portion 611. In the illustrated example, a peripheral edge of the flange portion 611 is fixed to the peripheral wall 21 of the pipe body 2 at a welded portion W1. When the flange portion 611 is fixed at the welded portion W1, the bearing case 61 is fixed to the pipe body 2 corresponding to the housing. Note that the welded portion W1 can also be formed inward of the peripheral edge of the flange portion 611 and is preferably formed continuously in the circumferential direction of the flange portion 611 from the perspective of suppressing heat deformation of the bearing case 61 and the pipe body 2 after welding. In addition, a separation distance between the root of the flange portion 611 and the welded portion W1 is preferably greater than or equal to 3 mm from the perspective of ensuring stable fixing between the bearing case 61 and the pipe body 2 and reducing thermal influence on a bearing 71.

The bearing 71, which supports the rotary shaft 3, is fitted into the bearing case 61 by press-fitting, such that the bearing 71 is mounted to the pipe body 2 corresponding to the housing via the bearing case 61. The bearing 71 supports one end portion side in the axial direction of the rotary shaft 3 that protrudes outward of the pipe body 2 from the rotary shaft insertion hole 22.

A bearing case 62 having a substantially hat-like shape and a closed apex portion is disposed outward of the rotary shaft insertion hole 23. As illustrated in FIG. 3(b), the bearing case 62 includes a base portion 622 having a substantially cylindrical shape and an open apex portion, a flange portion 621 formed to spread outward from one end portion of the base portion 622 in the axial direction, and a closed portion 623 that closes the apex portion located on an end portion side on a side opposite to the flange portion 621 of the base portion 622 in the axial direction. The bearing case 62 is an integrally formed member formed of a single metal material by press deformation such as press working, and is formed by being deformed such that the flange portion 621 bends from one end portion of the base portion 622 in the axial direction. The flange portion 621 is curved to match the outer peripheral surface of the pipe body 2, is formed recessed in an arc shape as viewed from the axial direction of the pipe body 2, and is formed to expand toward the pipe body 2 in an arc shape in a direction orthogonal to the axial direction of the pipe body 2.

The flange portion 621 formed by being deformed to match the outer peripheral surface of the peripheral wall 21 of the pipe body 2 is disposed along the outer peripheral surface of the peripheral wall 21 of the pipe body 2 corresponding to the housing, and is welded and fixed to the peripheral wall 21 of the pipe body 2 at an outward position separated from the root of the flange portion 621. In the illustrated example, a peripheral edge of the flange portion 621 is fixed to the peripheral wall 21 of the pipe body 2 at a welded portion W2. When the flange portion 621 is fixed at the welded portion W2, the bearing case 62 is fixed to the pipe body 2 corresponding to the housing. Note that the welded portion W2 can also be formed inward of the peripheral edge of the flange portion 621 and is preferably formed continuously in the circumferential direction of the flange portion 621 from the perspective of suppressing heat deformation of the bearing case 62 and the pipe body 2 after welding. In addition, a separation distance between the root of the flange portion 621 and the welded portion W2 is preferably greater than or equal to 3 mm from the perspective of ensuring stable fixing between the bearing case 62 and the pipe body 2 and reducing thermal influence on a bearing 72.

The bearing 72, which supports the rotary shaft 3, is fitted into the bearing case 62 by press-fitting such that the bearing 72 is attached to the pipe body 2 corresponding to the housing via the bearing case 62. The bearing 72 supports the other end portion side in the axial direction of the rotary shaft 3 that protrudes outward of the pipe body 2 from the rotary shaft insertion hole 23.

Figure 2:
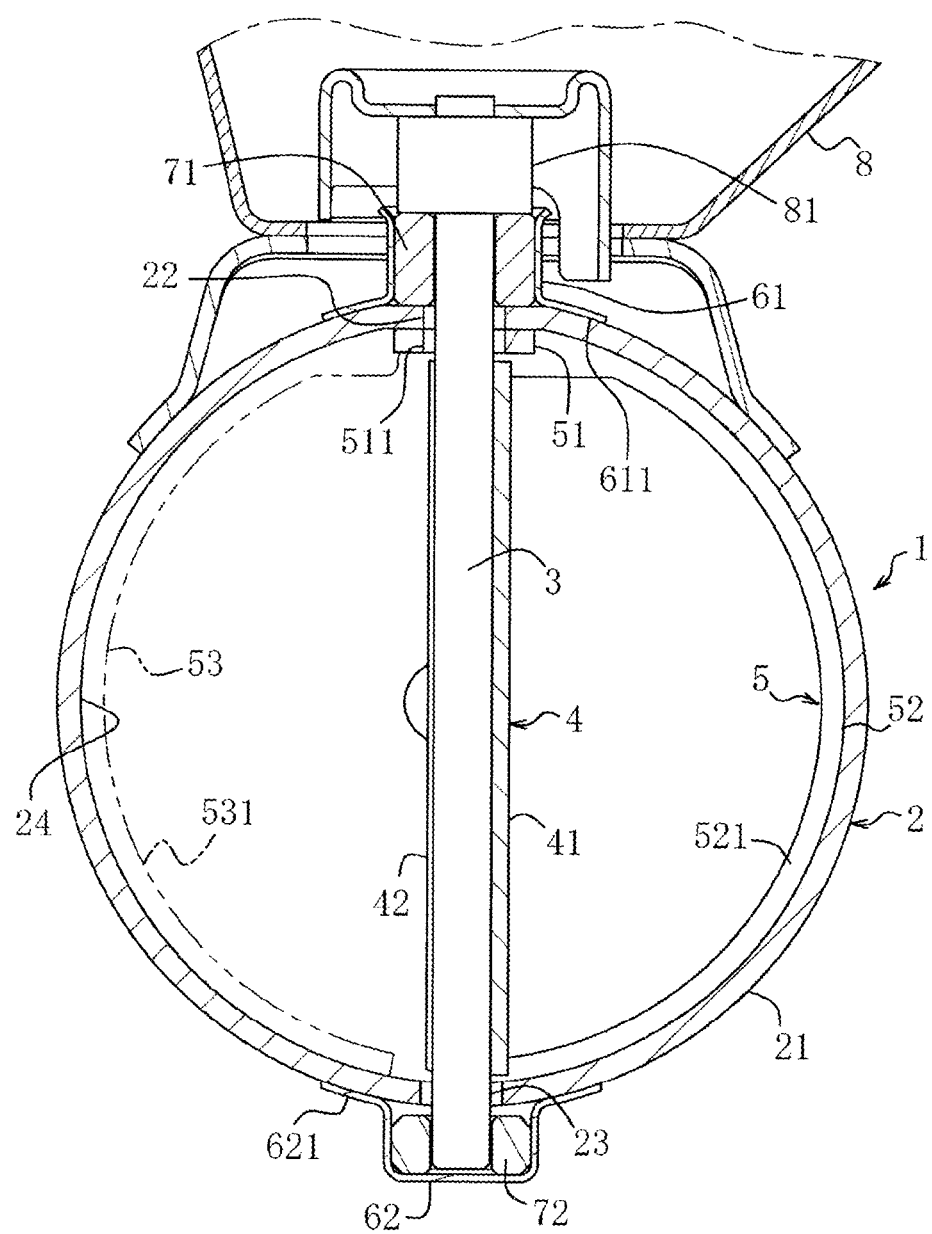
FIG. 2 is a transverse cross-sectional view illustrating an open state of the exhaust valve including the bearing attachment structure according to the embodiment.
Figure 3:
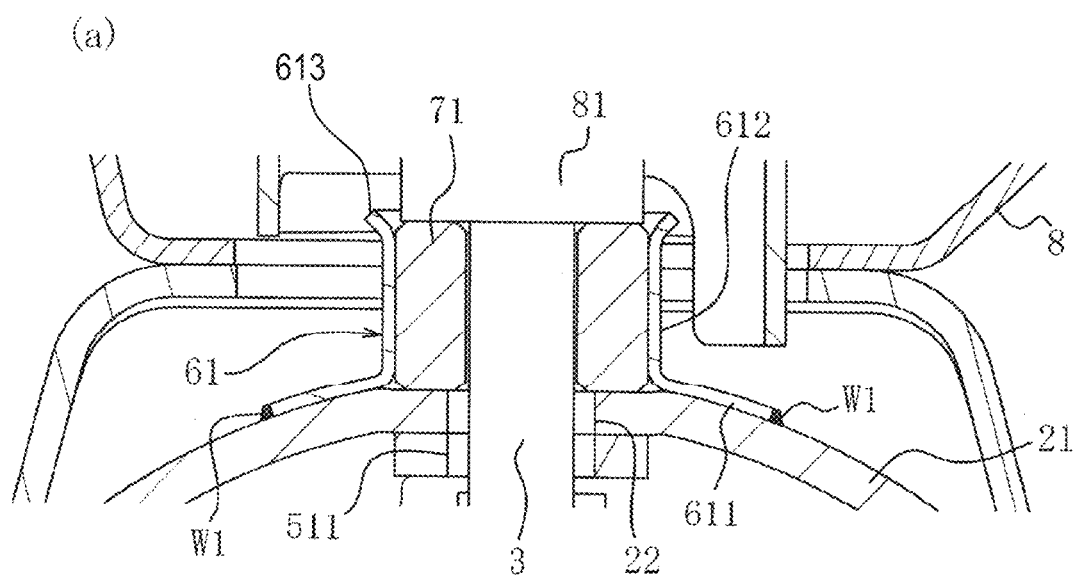
FIG. 3(a) and FIG. 3(b) are enlarged views illustrating a vicinity of a bearing and a bearing case illustrated in FIG. 2.
Figure 3:
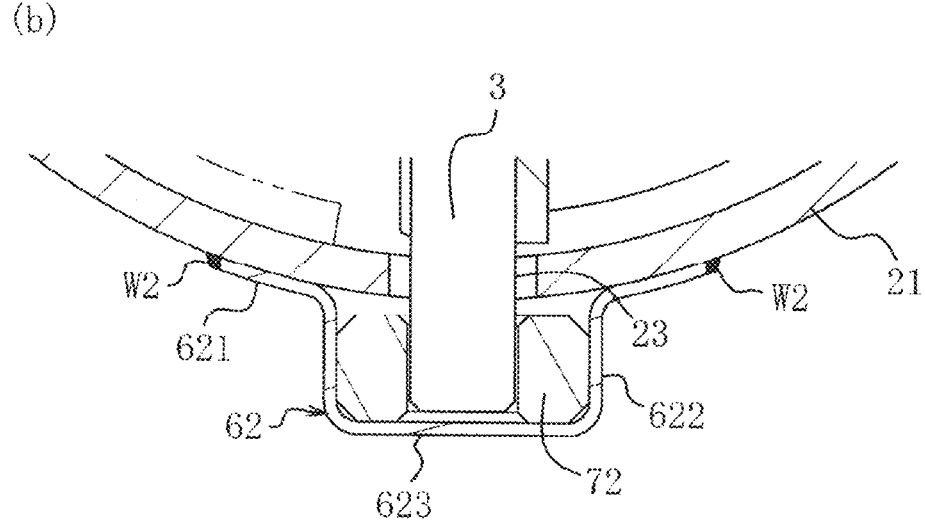
Figure 4A:
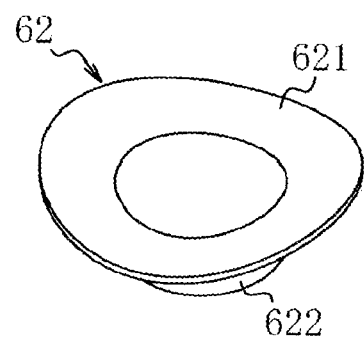
FIG. 4(a) is a perspective view of the bearing case in the bearing attachment structure according to the embodiment as viewed from a flange portion side.
Figure 4B:
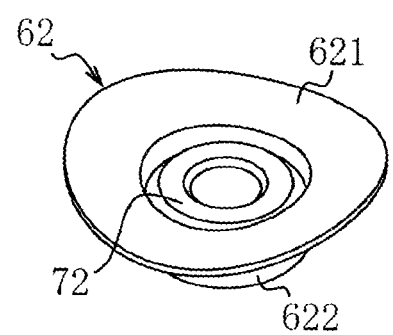
FIG. 4(b) is a schematic view illustrating a state in which the bearing is installed in the bearing case of FIG. 4(a)
Figure 4C:
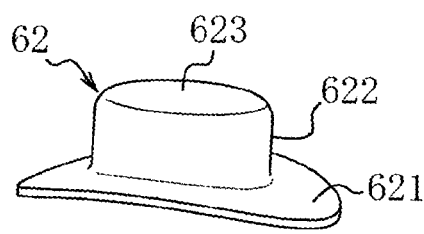
FIG. 4(c) is a perspective view of the bearing case of FIG. 4(a) as viewed from a closed portion side.

The one end portion of the rotary shaft 3 in the axial direction protrudes further outward than the bearing 71 and is coupled to a drive transmission portion 81 of the actuator 8. The rotary shaft 3 is configured to be operated to rotate via the drive transmission portion 81 by drive of the actuator 8. Rotation of the rotary shaft 3 causes the valve plate 4 to rotate and open/close the exhaust flow path in the pipe body 2. As shown by FIGS. 2 and 3(a), the drive transmission portion 81 abuts an end face of the bearing 71 exposed through the opposite end of the substantially cylindrical shaped base portion 612.

The valve plate 4 is formed in a substantially circular shape in a front view in the illustrated example, and has a stepped shape including, formed integrally, a first flat plate portion 41 having a substantially semicircular shape and a second flat plate portion 42 having a substantially semicircular shape, which are continuous via a curved plate portion 43. The first flat plate portion 41 having a substantially semicircular shape and the second flat plate portion 42 having a substantially semicircular shape are disposed extending substantially in parallel. The first flat plate portion 41 is formed to be longer in the direction orthogonal to the axial direction of the rotary shaft 3 than the second flat plate portion 42 and to have a larger area than the second flat plate portion 42. The curved plate portion 43 provided between the first flat plate portion 41 and the second flat plate portion 42 is disposed substantially along the outer peripheral surface of the rotary shaft 3 and is fixed to the rotary shaft 3 by welding or the like.

As illustrated in FIGS. 2 to 6, the stopper 5 is an integrally formed member having a substantially C-shape in a front view. The stopper 5 includes a base portion 51 including an insertion hole 511 configured to receive insertion of the rotary shaft 3, a first contact portion 52 having a substantially arc shape and formed on one side of the base portion 51 upstream and downstream of the exhaust and a second contact portion 53 having a substantially arc shape and formed on another side of the base portion 51 upstream and downstream of the exhaust. The first contact portion 52 having a substantially arc shape runs along an inner peripheral surface 24 of the pipe body 2, and the second contact portion 53 having a substantially arc shape runs along the inner peripheral surface 24 of the pipe body 2 and extends along a side opposite to the first contact portion 52 in a pipe body circumferential direction, inside of the pipe body 2. The stopper 5 is fixed to the peripheral wall 21 of the pipe body 2 by a welding method such as penetration welding, or the like.

Figure 5:
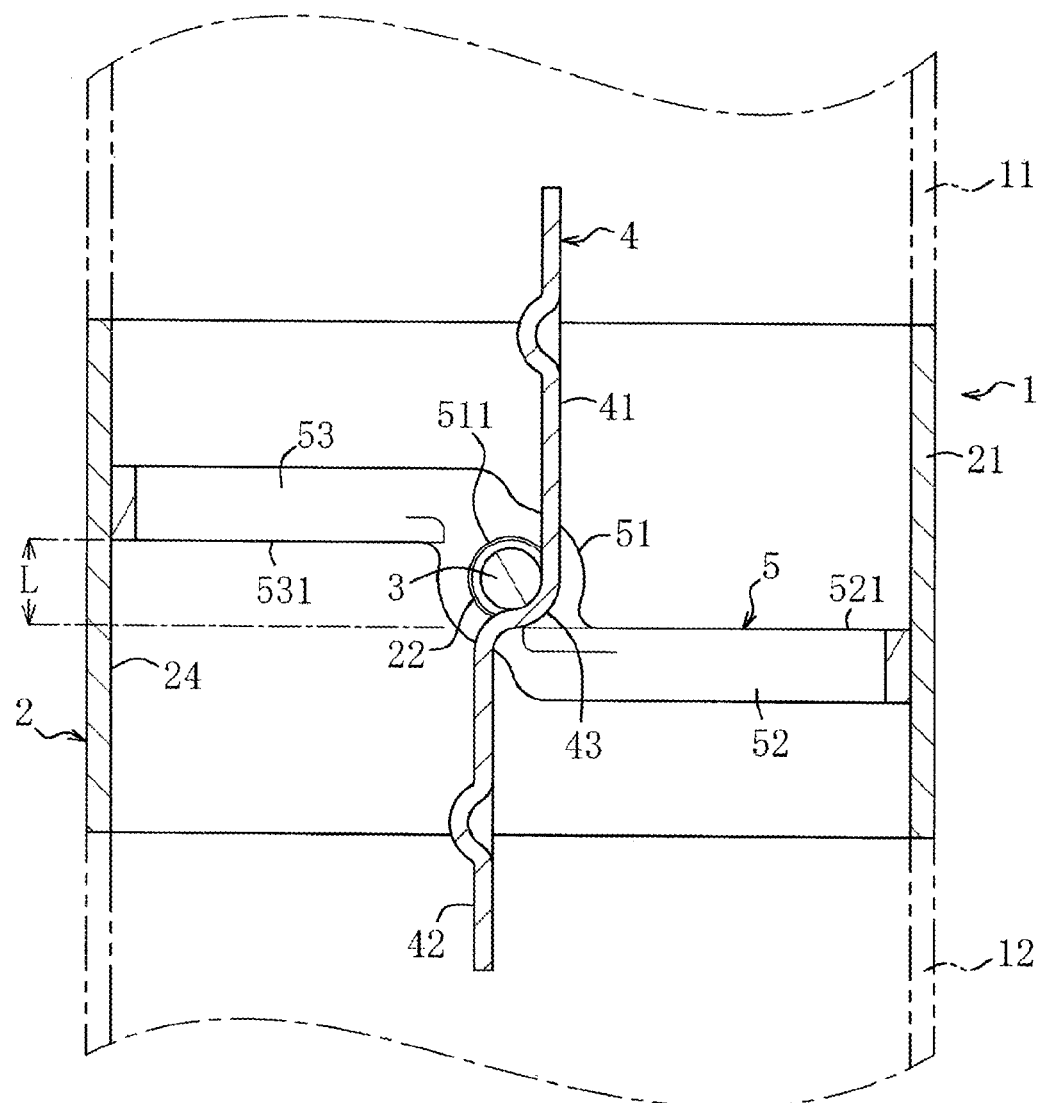
FIG. 5 is a longitudinal cross-sectional view illustrating an open state of the exhaust valve including the bearing attachment structure according to the embodiment as viewed from a bottom face side.
Figure 6:
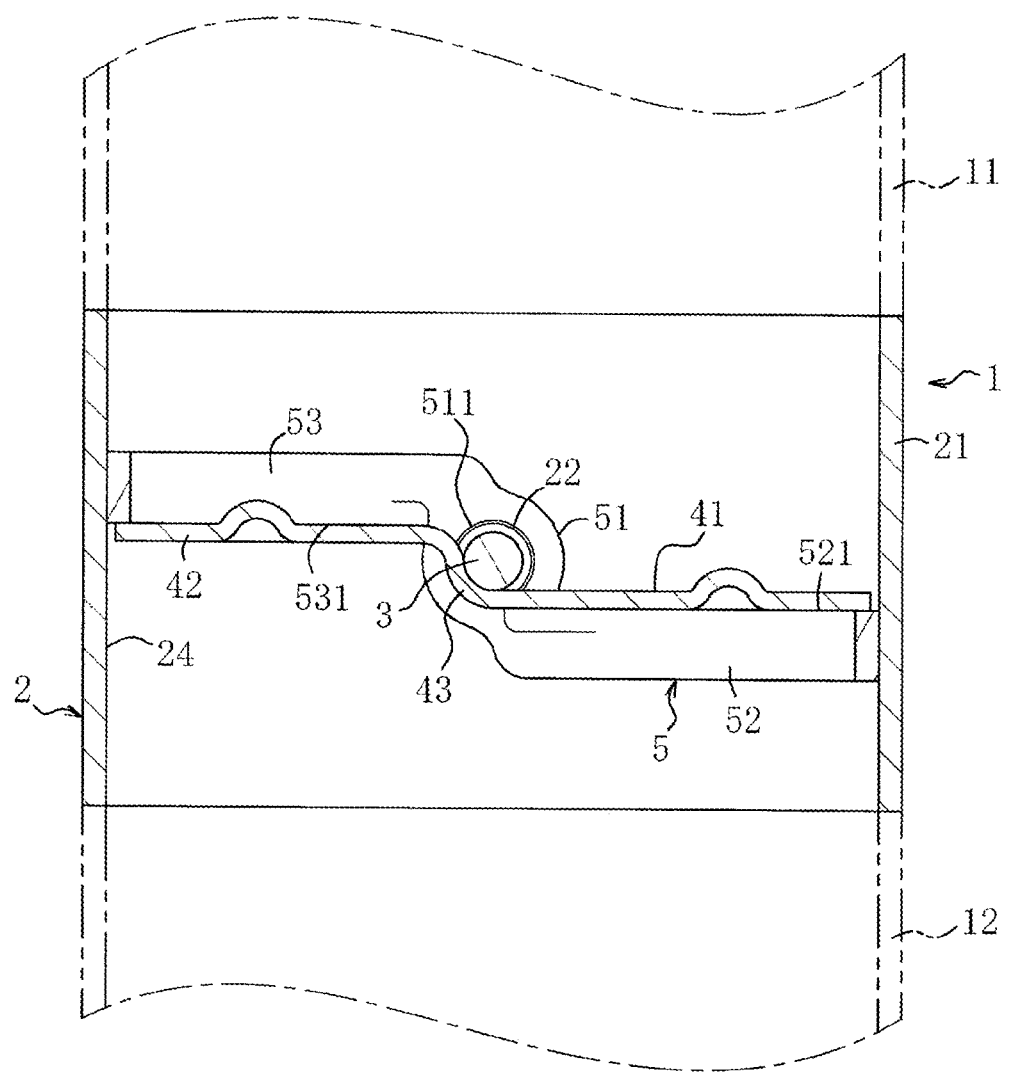
FIG. 6 is a longitudinal cross-sectional view illustrating a closed state of the exhaust valve including the bearing attachment structure according to the embodiment as viewed from a bottom face side.
Figure 7:
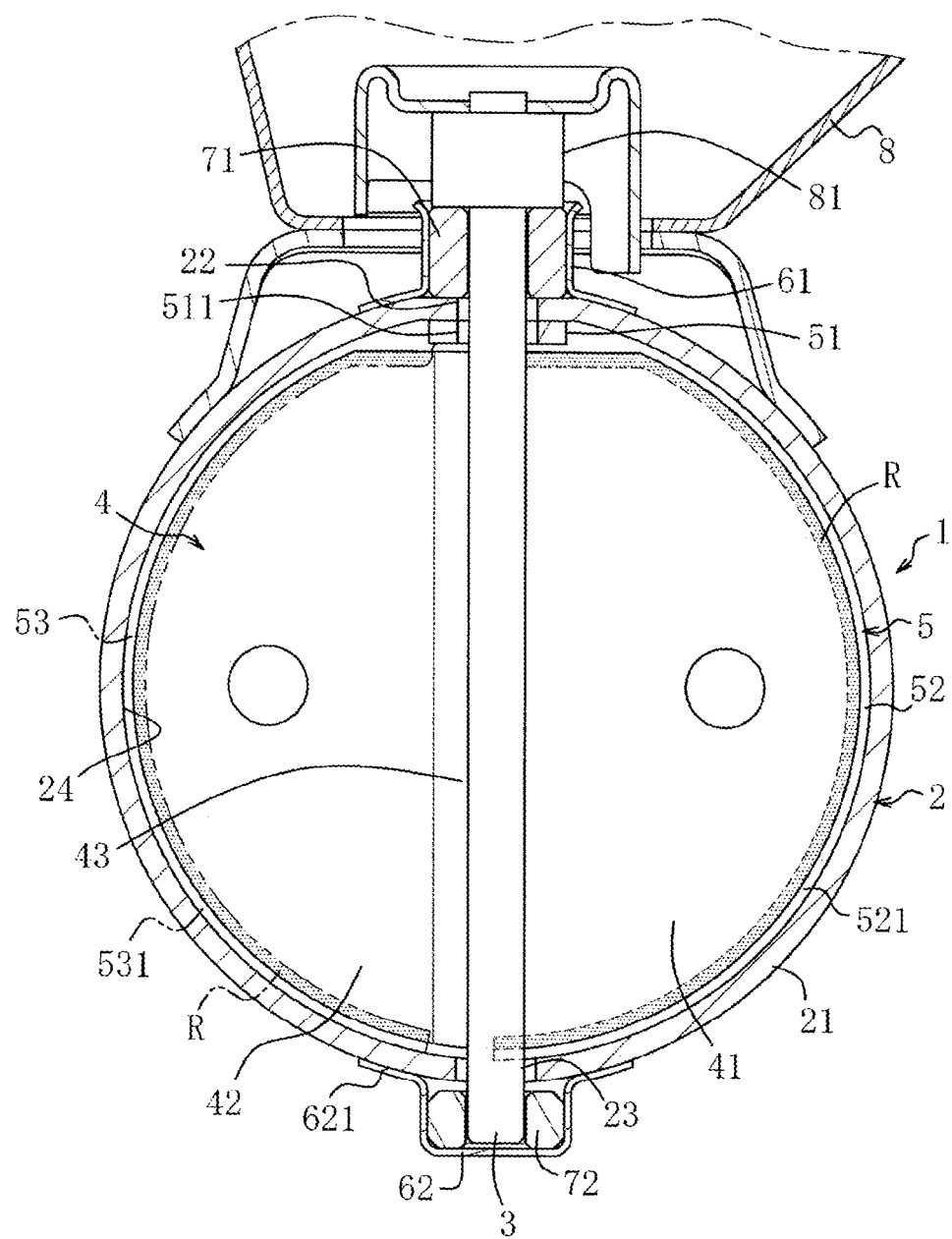
FIG. 7 is a partial cross-sectional view illustrating the closed state of the exhaust valve including the bearing attachment structure according to the embodiment.

The first contact portion 52 and the second contact portion 53 of the stopper 5 are formed and disposed at positions abutting against the valve plate 4 in a state where the rotating valve plate 4 reaches a position of closing the exhaust flow path. Further, a contact surface 521, of the first contact portion 52, at which the valve plate 4 makes contact and a contact surface 531, of the second contact portion 53, at which the valve plate 4 makes contact make contact with the valve plate 4 that has reached the position of closing the exhaust flow path of the pipe body 2 to restrict rotational operation of the valve plate 4. FIG. 5 illustrates the valve plate 4 at the position of closing the exhaust flow path of the pipe body 2 and a contact region R formed when the contact surface 521 of the first contact portion 52 and the contact surface 531 of the second contact portion 53 come into contact with the valve plate 4.

In the stopper 5, a distance L, in the axial direction of the pipe body 2, between the contact surface 521, of the first contact portion 52, at which the valve plate 4 makes contact and the contact surface 531, of the second contact portion 53, at which the valve plate 4 makes contact is set and formed larger than the axial diameter of the rotary shaft 3. A distal end of the first contact portion 52 having a substantially arc shape and a distal end of the second contact portion 53 having a substantially arc shape are configured not to come into contact with a portion in the vicinity of the other end portion of the rotary shaft 3 in the axial direction located in the vicinity of the rotary shaft insertion hole 23, and to not interfere with each other (see FIGS. 3 and 2).

In the exhaust valve 1 according to the present embodiment, drive of the actuator 8 is controlled by control performed by a control device (not illustrated), and the rotary shaft 3 and the valve plate 4 are rotated to switch between an open state and a closed state. When the exhaust valve 1 is in the open state, a direction in which surfaces of the first flat plate portion 41 and the second flat plate portion 42 of the valve plate 4 extend follows the exhaust flow path inside the pipe body 2 and the pipe axial direction (see FIGS. 2 and 5). When the exhaust valve 1 is in the closed state, the first flat plate portion 41 and the second flat plate portion 42 of the valve plate 4 are disposed blocking the exhaust flow path inside the pipe body 2, the first flat plate portion 41 abuts against the contact surface 521 of the first contact portion 52 of the stopper 5 and the second flat plate portion 42 abuts against the contact surface 531 of the second contact portion 53 of the stopper 5 to close and suppress flow of the exhaust in the downstream pipe 12 to the extent possible (see FIGS. 1, 6 and 7).

According to the bearing attachment structure according to the present embodiment, since the bearing cases 61 and 62 are welded to the pipe body 2 corresponding to the housing at the flange portions 611 and 621, respectively, the distances to the bearings 71 and 72 from the welded portions can be made long, the amount of heat transferred to the bearings 71 and 72 installed in the bearing cases 61 and 62 during welding can be reduced to the extent possible, and damage to the bearings 71 and 72 caused by welding heat can be greatly reduced. Accordingly, breakage of the bearings 71 and 72, deterioration of the lubricant on the bearings 71 and 72, and a reduction in service life of the bearings 71 and 72 can be reliably prevented.

Further, since the flange portions 611 and 621 of the bearing cases 61 and 62 are formed to be curved to match the outer peripheral surface of the peripheral wall 21 of the pipe body 2, damage to the bearings 71 and 72 caused by welding heat when the bearing cases 61 and 62 and the bearings 71 and 72 installed inside the bearing cases 61 and 62 are attached to the outer peripheral surface of the pipe body 2 having a curved plane shape, can be greatly reduced, and the bearing cases 61 and 62 can be attached to the outer peripheral surface of the pipe body 2 having a curved plane shape, stably and with high strength. Further, in a configuration in which the pipe body 2 is an exhaust flow path, since the bearing cases 61 and 62 can be attached without protruding inside the pipe body 2, that is, inside the flow path and narrowing the flow path cross section, the flow path performance of the pipe body 2 can be maintained.

Further, since the flange portions 611 and 621 are formed by being deformed to bend from one end portion of the base portions 612 and 622 in the axial direction, the bearing cases 61 and 62 can be formed by being bent by press working or the like, the bearing cases 61 and 62 can be formed without an expensive cutting step, and manufacturing costs of the product including the bearing cases 61 and 62 and the bearing attachment structure can be reduced and the product can be manufactured efficiently. In particular, when the bearing cases 61 and 62 each have a shape that curves to match the outer peripheral surface of the pipe body 2 and are formed by a cutting process, processing costs are high and processing time is relatively high. However, when the bearing cases 61 and 62 each have the above-described shape, the bearing cases 61 and 62 can be manufactured extremely cheaply and very efficiently.

Further, since the one bearing case 62 is an integrally formed member formed such that an apex portion located on one end portion side of the base portion 622 in the axial direction is closed by the closed portion 623, there is no need to retrofit a cap to close the apex portion, the number of components can be reduced and hence costs can be reduced, and the manufacturing process can be made more efficient by eliminating a cap retrofitting process.

Scope of Inclusion of Invention Disclosed in Present Specification

The invention disclosed in the present specification includes, in addition to the inventions listed as inventions and embodiments, those specified by changing the partial contents thereof to other contents disclosed in the present specification to an applicable extent, those specified by adding other contents disclosed in the present specification to these contents, or those specified by deleting these partial contents to the extent that a partial action and effect can be obtained and making them into a higher concept. The invention disclosed in the present specification also includes the following modifications and additions.

In the embodiment described above, an example is described in which the bearing attachment structure according to the present invention is attached to the exhaust valve 1, but the bearing attachment structure according to the present invention may be any bearing attachment structure within the scope of the present invention and also includes a bearing attachment structure provided in a product other than an exhaust valve. In addition, in the embodiment described above, the pipe body 2 having an outer peripheral surface with a cylindrical plane shape is described as a preferable example of the housing, but the housing in the bearing attachment structure according to the present invention also includes a housing other than the pipe body 2, such as a housing having a surface with a curved plane shape or a surface having a flat plane shape.

INDUSTRIAL APPLICABILITY

The present invention can be applied to a bearing attachment structure for attaching a bearing that supports, for example, a rotary shaft of a valve plate provided extending through an exhaust path of an automobile or the like.

REFERENCE SIGNS LIST

1 Exhaust valve
2 Pipe body
21 Peripheral wall
22, 23 Rotary shaft insertion hole
24 Inner peripheral surface
3 Rotary shaft
4 Valve plate
41 First flat plate portion
42 Second flat plate portion 43 Curved plate portion
5 Stopper
51 Base portion
511 Insertion hole
52 First contact portion
521 Contact surface
53 Second contact portion
531 Contact surface
61, 62 Bearing case
611, 621 Flange portion
612, 622 Base portion
623 Closed portion
71, 72 Bearing
8 Actuator
81 Drive transmission portion
11 Upstream pipe
12 Downstream pipe
W1, W2 Welded portion
R Contact region formed when contact surface of first contact portion and contact surface of second contact portion come into contact with valve plate
L Distance, in axial direction of pipe body, between contact surface of first contact portion and contact surface of second contact portion

The invention claimed is:

1. A bearing attachment structure for attaching a bearing that supports a rotary shaft inserted into a housing, the bearing attachment structure comprising:
a bearing case including a base portion having a substantially cylindrical shape and a flange portion formed to spread outward from one end portion of the base portion in the axial direction, the bearing being installed in the base portion by press-fitting, wherein
the bearing case is disposed by aligning the flange portion with respect to the housing,
the bearing case is welded to the housing at the flange portion,
the flange portion is formed by bending the one end portion at one end of the base portion in the axial direction such that the one end of the substantially cylindrical shaped base portion is open to the housing, the one end being adjacent to the housing,
an opposite end of the substantially cylindrical shaped base portion opposite to the one end in the axial direction is open,
the bearing case is welded to the housing at an entire circumferential edge of the flange portion,
the substantially cylindrical shaped base portion has a single layer structure, and
the opposite end of the substantially cylindrical shaped base portion is bent outward away from an axis of the substantially cylindrical shaped base portion,
wherein the rotary shaft is coupled to a drive transmission portion of an actuator which rotates the rotary shaft via the drive transmission portion, the drive transmission portion abutting an end face of the bearing exposed through the opposite end of the substantially cylindrical shaped base portion.

2. The bearing attachment structure according to claim 1, comprising:
a first bearing supporting one end portion side of the rotary shaft in the axial direction and a first bearing case including the first bearing; and
a second bearing supporting another end portion side of the rotary shaft in the axial direction and a second bearing case including the second bearing, wherein
one of the first bearing case and the second bearing case is an integrally formed member formed such that an apex portion located on one end portion side of the base portion in the axial direction is closed.

3. The bearing attachment structure according to claim 1, wherein
the housing is a pipe body having a substantially cylindrical shape,
the flange portion is formed to be curved to match an outer peripheral surface of the pipe body, and
the bearing case is welded to the pipe body at the flange portion.

4. The bearing attachment structure according to claim 3, comprising:
a first bearing supporting one end portion side of the rotary shaft in the axial direction and a first bearing case including the first bearing; and
a second bearing supporting another end portion side of the rotary shaft in the axial direction and a second bearing case including the second bearing, wherein
one of the first bearing case and the second bearing case is an integrally formed member formed such that an apex portion located on one end portion side of the base portion in the axial direction is closed.

* * * * *